(12) United States Patent
Yamamoto et al.

(10) Patent No.: US 7,491,378 B2
(45) Date of Patent: Feb. 17, 2009

(54) ELECTRODE STRUCTURE PRODUCTION PROCESS

(75) Inventors: Tomoya Yamamoto, Nara (JP); Soichiro Kawakami, Nara (JP); Naoya Kobayashi, Nara (JP)

(73) Assignee: Canon Kabushiki Kaisha, Tokyo (JP)

( * ) Notice: Subject to any disclaimer, the term of this patent is extended or adjusted under 35 U.S.C. 154(b) by 1030 days.

(21) Appl. No.: 10/820,029

(22) Filed: Apr. 8, 2004

(65) Prior Publication Data

US 2004/0195546 A1  Oct. 7, 2004

Related U.S. Application Data

(62) Division of application No. 09/238,551, filed on Jan. 28, 1999, now Pat. No. 6,932,955.

(30) Foreign Application Priority Data

Jan. 30, 1998 (JP) ................... 10-018932

(51) Int. Cl.
 *C01D 5/10* (2006.01)
(52) U.S. Cl. .................... 423/518; 429/231.2
(58) Field of Classification Search ............... 423/518; 429/231.2
 See application file for complete search history.

(56) References Cited

U.S. PATENT DOCUMENTS 5,665,491 A * 9/1997 Tomiyama et al. ....... 429/218.1

* cited by examiner

*Primary Examiner*—Edward M Johnson
(74) *Attorney, Agent, or Firm*—Fitzpatrick, Cella, Harper & Scinto

(57) ABSTRACT

A powder material comprising a compound which electrochemically intercalates and deintercalates a lithium ion. The powder material is comprised mainly of a compound containing at least an oxygen element, a sulfur element and at least one transition metal element.

21 Claims, 5 Drawing Sheets

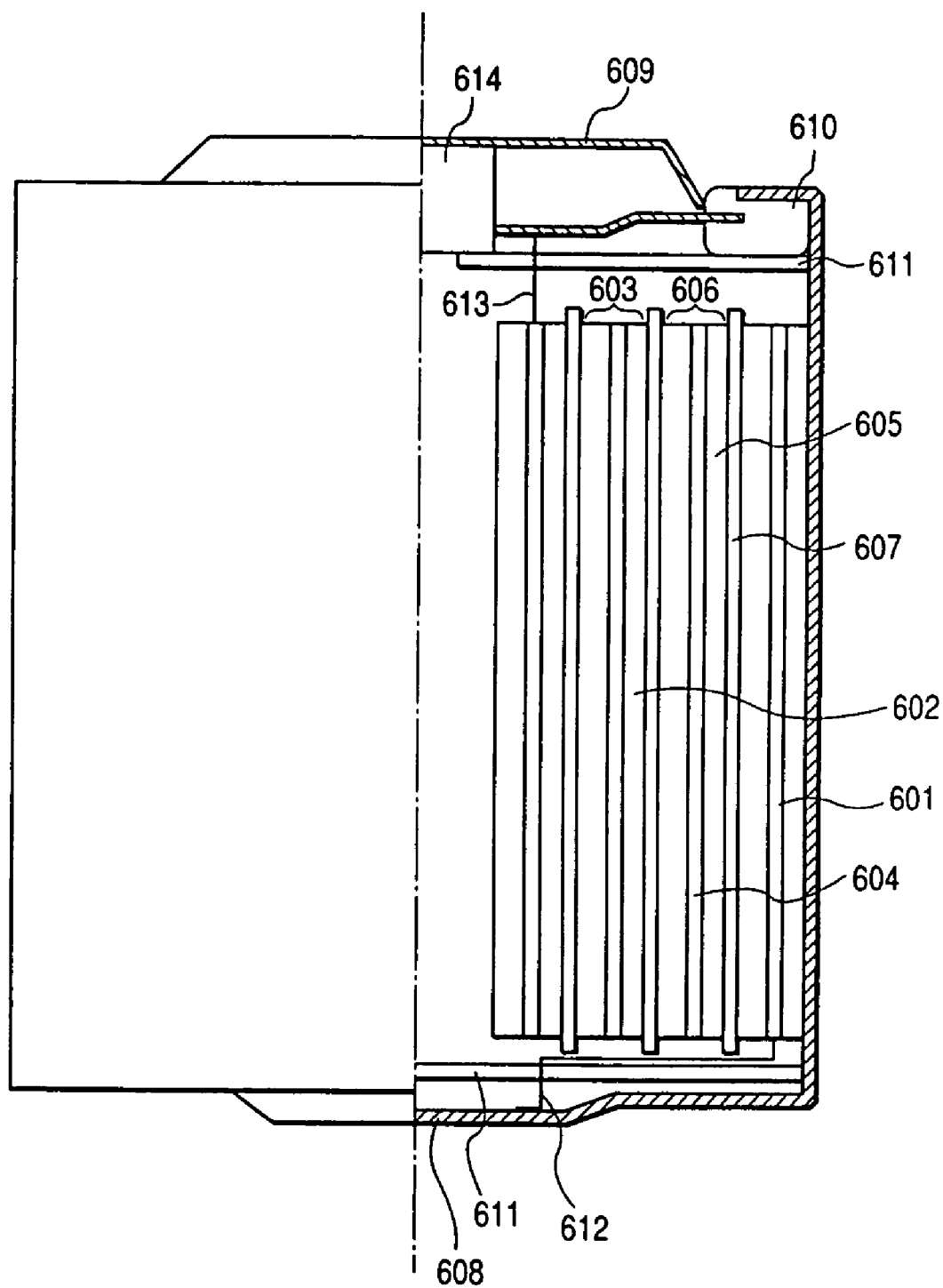

ELECTRODE STRUCTURE PRODUCTION PROCESS

This is a divisional application of Application Ser. No. 09/238,551, filed Jan. 28, 1999.

BACKGROUND OF THE INVENTION

1. Field of the Invention

The present invention relates to a powder material, an electrode structure, production processes thereof, and a secondary lithium battery, and more particularly to a secondary lithium battery which has an electrode structure comprised of a specific powder material and is high in capacity, and charging and discharging efficiency, and production processes of such powder material and electrode structure.

2. Related Background Art

It has recently been predicted that since the amount of carbon dioxide ($CO_2$) gas contained in the air is increasing, the warming of the earth occurs due to a green house effect. For this reason, a new construction of a thermal power plant, from which $CO_2$ gas is exhausted in plenty, has come to be difficult. Accordingly, there has been proposed, as an effective use of electric power generated by a generator in a thermal power plant or the like, the so-called load leveling in which night electric power is stored in a secondary battery installed in a general home, and this electric power is used in the daytime that power consumption increases, to level the load. It is also expected to develop a secondary battery having a high energy density as a secondary battery essential to electric cars having a feature that no air pollutant is exhausted. Further, it is of urgent necessity to develop a miniature, light-weight and high-performance secondary battery for a power source of portable equipment such as book type personal computers, word processors, video cameras and portable telephones.

Since an example where a lithium-graphite intercalation compound is applied to a negative electrode for a secondary battery was reported as such a miniature, light-weight and high-performance secondary battery in JOURNAL OF THE ELECTROCHEMICAL SOCIETY, 117, 222 (1970), the development of, for example, a rocking chair type secondary battery, or the so-called "lithium ion battery", in which carbon (also including graphite) is used as an active material for negative electrode and an intercalation compound, in which a lithium ion has been introduced, as an active material for positive electrode, and lithium is intercalated between layers of carbon by a charge reaction to store It, has proceeded, and such a battery is in practical use. In the lithium ion battery, carbon of a host material between the layers of which lithium is intercalated as a guest material is used in a negative electrode, whereby dendrite growth of lithium upon charging is controlled to achieve a long life in a charging and discharging cycle.

In the lithium ion battery in which carbon is used as an active material for negative electrode, however, the cycle life is long, but its energy density does not reach that of a lithium battery in which metallic lithium itself is used as a negative active material.

Accordingly, carbon materials of still higher capacity to be used in a negative electrode of a lithium ion battery are extensively researched and developed. In order to realize a secondary battery having a higher energy density, it is essential to develop not only a material for a negative electrode, but also a material for a positive electrode having a higher capacity. Under the circumstances, lithium-transition metal oxide in which a lithium ion has been intercalated into an intercalation compound is mainly used as an active material for positive electrode. However, a discharge capacity of 40 to 60% of the theoretical capacity is only achieved. Therefore, there is also a strong demand for development of a positive electrode having a cycle life of practical levels and a higher capacity in secondary lithium batteries including "lithium ion battery" utilizing a lithium ion as a guest for charging and discharging.

SUMMARY OF THE INVENTION

It is an object of the present invention to provide a secondary lithium battery utilizing the intercalation and deintercalation reaction of a lithium ion for charging and discharging, wherein the battery has an electrode structure comprised of a specific powder material and is high in capacity, and charging and discharging efficiency.

Another object of the present invention is to provide production processes of a powder material as an electrode material and an electrode structure used in the lithium battery.

The present inventors have found that in a secondary lithium battery fabricated from at least electrode structures of a negative electrode and a positive electrode, an electrolyte, a collecting electrode, and a battery case and utilizing the intercalation and deintercalation reaction of a lithium ion for charging and discharging, the use of a powder material comprised mainly of a compound containing at least an oxygen element, a sulfur element and a transition metal element for at least one of the electrode structures permits the provision of a secondary lithium battery which is high in capacity, and charging and discharging efficiency and has a long life.

According to the present invention, there is thus provided a powder material comprising a compound which electrochemically intercalates and deintercalates a lithium ion, wherein the powder material is comprised of a compound as a main material, which compound contains at least an oxygen element, a sulfur element and at least one transition metal element.

According to the present invention, there is also provided a process for preparing a powder material comprised mainly of a compound which electrochemically intercalates and deintercalates a lithium ion and contains at least an oxygen element, a sulfur element and at least one transition metal element, the process comprising at least one step selected from a group consisting of:

I) a step of heating at least one compound (a) selected from a group consisting of carbonates, organic carboxylates, nitrates, hydroxides and oxides of transition metals, and a sulfur compound (b) which forms hydrogen sulfide or sulfur, in a closed vessel;

II) the step of heating at least one compound (c) selected from a group consisting of sulfides, thiocarbonates, thiosulfates, thiocyanates, thioglicolates and thiourea complexes of transition metals and at least one compound (d) selected from a group consisting of carbonates, carbonic acid, organic carboxylates, organic carboxylic acids, nitrates, nitric acid, hydroxides and oxides, which contains no transition metal element, in a closed vessel; and III) the step of heating at least one compound (a) selected from a group consisting of carbonates, organic carboxylates, nitrates, hydroxides and oxides of transition metals and at least one compound (c) selected from a group consisting of sulfides, thiocarbonates, thiosulfates, thiocyanates, thioglicolates and thiourea complexes of transition metals in a closed vessel.

According to the present invention, there is further provided an electrode structure for a battery utilizing the intercalation and deintercalation reaction of a lithium ion, the structure comprising the powder material described above as a main component.

According to the present invention, there is still further provided a process for producing an electrode structure for a battery utilizing the intercalation and deintercalation reaction of a lithium ion, the process comprising the steps of preparing a powder material which electrochemically intercalates and deintercalates a lithium ion and contains at least an oxygen element, a sulfur element and at least one transition metal element; and molding the powder material to obtain a structure.

According to the present invention, there is yet still further provided a process for producing an electrode structure for a battery utilizing the intercalation and deintercalation reaction of a lithium ion, the process comprising the steps of preparing a powder material, which electrochemically intercalates and deintercalates a lithium ion and contains at least an oxygen element, a sulfur element and at least one transition metal element, in accordance with the preparation process described above; and molding the powder material to obtain a structure.

According to the present invention, there is yet still further provided a secondary lithium battery fabricated from at least a negative electrode, a positive electrode, an electrolyte and a battery case and utilizing the intercalation and deintercalation reaction of a lithium ion for charging and discharging, wherein the negative electrode and/or the positive electrode is comprised of an electrode structure comprising, as a main component, the powder material described above, which electrochemically intercalates and deintercalates a lithium ion and contains at least an oxygen element, a sulfur element and at least one transition metal element.

In the present invention, secondary batteries utilizing the intercalation and deintercalation reaction according to the redox reaction of a lithium ion for charging and discharging at electrodes are called secondary lithium batteries, including "lithium ion batteries" using a carbon material as a material for a negative electrode.

In the present invention, it has been possible to realize a secondary lithium battery, which is high in capacity, and charging and discharging efficiency and has a long life, by using, as an active material comprised of a powder material for forming electrode(s) in the secondary lithium battery, a powder material comprised mainly of a compound which intercalates and deintercalates a lithium ion and contains at least an oxygen element, a sulfur element and at least one transition metal element. In the present invention, the "active material" will hereinafter be referred to a material participating in an electrochemical reaction (repeated reaction) of charging and discharging in a battery. In particular, a material in which lithium has been intercalated and in or from which lithium can be reversibly intercalated or deintercalated according to an electrochemical reaction is called an active material in a secondary lithium battery. The above marked effect is considered to be attributable to the fact that the compound constituting the powder material, from which the active material is formed, contains a sulfur element greater in elementary radium than an oxygen element, whereby lattice spacing can be moderately widened to deintercalate and intercalate the lithium ion, and that this widened lattice spacing permits facilitating migration of the lithium ion, which attends an electrochemical reaction, and controlling strain caused by the cubic expansion of the active material upon intercalation of the lithium ion, so that the electrochemical reaction by charging and discharging can be allowed to efficiently proceed, even a great current can be easily passed, a battery capacity can be increased, and electrode breaking caused by repeated charging and discharging can be inhibited due to the reduction of strain caused by the cubic expansion of the active material.

In the present invention, it has also been possible to fabricate a secondary lithium battery, which is high in capacity, and charging and discharging efficiency and has a long life, by preparing the powder material comprised mainly of a compound which electrochemically intercalates and deintercalates a lithium ion and contains at least an oxygen element, a sulfur element and at least one transition metal element in accordance with the process comprising at least one step of:

I) the step of heating at least one compound (a) selected from a group consisting of carbonates, organic carboxylates, nitrates, hydroxides and oxides of transition metals and a sulfur compound (b), which forms hydrogen sulfide or sulfur, in a closed vessel;

II) the step of-heating at least one compound (c) selected from a group consisting of sulfides, thiocarbonates, thiosulfates, thiocyanates, thioglicolates and thiourea complexes of transition metals and at least one compound (d) selected from a group consisting of carbonates, carbonic acid, organic carboxylates, organic carboxylic acids, nitrates, nitric acid, hydroxides and oxides, which contains no transition metal element, in a closed vessel; and III) the step of heating at least one compound (a) selected from a group consisting of carbonates, organic carboxylates, nitrates, hydroxides and oxides of transition metals and at least one compound (c) selected from a group consisting of sulfides, thiocarbonates, thiosulfates, thiocyanates, thioglicolates and thiourea complexes of transition metals in a closed vessel, to form an electrode structure comprised of the powder material, and applying the electrode structure to the secondary lithium battery. This is attributable to the fact that a compound having moderately widened lattice spacing can be formed with ease, since the reaction of the respective compounds (the compounds a and b, the compounds c and d, or the compounds a and c) under heating in each step of the steps (I) to (III) is conducted in the closed space (vessel), whereby the respective compounds and a reaction product are not flown off outside the reaction system, and so a sulfur element and an oxygen element are efficiently complexed with the compound (a) containing the oxygen element and transition metal element and with the compound (c) containing the sulfur element and transition metal element, respectively, and the oxygen element and sulfur element are uniformly dispersed in the respective complexes without locally existing.

Thus, in the secondary lithium battery utilizing the intercalation and deintercalation reaction of a lithium ion, the present invention can provides the powder material, electrode structure, and the secondary lithium battery, each of which is high in capacity, and charging and discharging efficiency.

BRIEF DESCRIPTION OF THE DRAWINGS

FIG. 7 is a cross-sectional view of a spiral type cylindrical battery.

DETAILED DESCRIPTION OF THE PREFERRED EMBODIMENTS

A powder material, an electrode structure and a secondary battery according to the embodiments of the present invention will hereinafter be described with reference to FIGS. 1 to 5.

Figure 1:
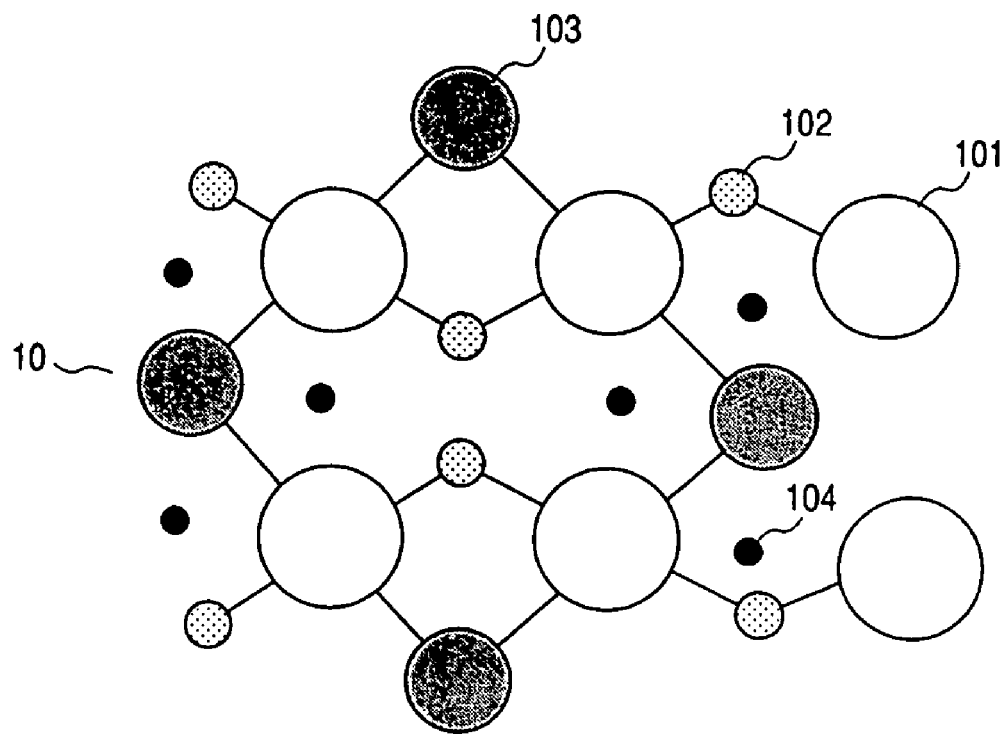
FIG. 1 schematically illustrates the structure of a powder material according to the present invention.

FIG. 1 is a conceptual view schematically illustrating the structure of a compound constituting the powder material according to the present invention. The compound (powder material) 10 has a structure that a transition metal element 101 is complexed with an oxygen element 102 and a sulfur element 103 and that a lithium ion 104 is intercalated into and deintercalated from the space lattice of the compound.

Figure 2:
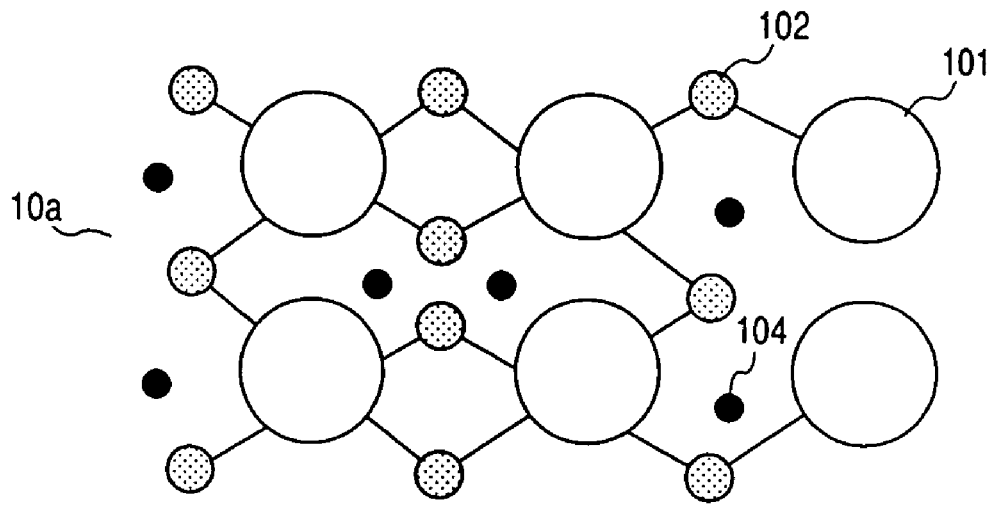
FIG. 2 schematically illustrates the structure of a general powder material.

FIG. 2 is a conceptual view schematically illustrating the structure of a compound constituting a powder material used in a general secondary lithium battery. The compound (powder material) 10a has a structure that a transition metal element 101 is complexed with an oxygen element 102 and that a lithium ion 104 is intercalated into and deintercalated from the space lattice of the compound.

(Powder Material)

The powder material according to the present invention is a powder material comprised mainly of a compound containing at least an oxygen element, a sulfur element and at least one transition metal element. As illustrated in FIG. 1, the compound 10 by which the present invention is characterized is considered to have a lattice structure that a transition metal element 101 is complexed with an oxygen element 102 and a sulfur element 103 greater in atomic radius than the oxygen element. It is also considered that the lattice spacing of the compound 10 is moderately widened compared with the lattice structure of the transition metal oxide 10a containing no sulfur element as illustrated in FIG. 2. It is further considered that since a lithium ion 104 is easily intercalated into or deintercalated from the wider space lattice of the compound 10, an electrochemical reaction by charging and discharging is allowed to efficiently proceed to enhance a charge and discharge capacity and that since strain caused by the cubic expansion of the compound, which attends the intercalation of the lithium ion, can be reduced, electrode breaking caused by repeated charging and discharging is inhibited.

The content of the compound 10 containing at least an oxygen element, a sulfur element and at least one transition metal element in the powder material is preferably 50% by weight or higher. More preferably, the powder material does not contain any other compound at all, since the migration of a lithium ion efficiently takes place to more enhance a charge and discharge capacity. The compound containing at least an oxygen element, a sulfur element and at least one transition metal element may contain other elements. It is preferred that the content of the other elements be preferably 40% or lower, more preferably 35% or lower in terms of the concentration based on the number of atoms of the elements because the lattice structure comprised of the oxygen, sulfur and transition metal elements as illustrated in FIG. 1 is stabilized to more enhance a cycle life.

In the powder material according to the present invention, a content ratio of the oxygen element to the sulfur element in the compound 10 as a main component is preferably within a range of from 0.1 to 100, more preferably from 0.5 to 50 in terms of an elementary molar ratio. With respect to the composition including the transition metal element, an elementary molar ratio of (the oxygen element+the sulfur element) to the transition metal element is preferably within a range of from 1.0 to 4.0, more preferably from 1.0 to 3.0. According to such a material composition, it is considered that the balance between the retentivity of the lithium ion in the space lattice and the migrating ability of the lithium ion in intercalation into and deintercalation from the space lattice is made better by using a moderately widened portion of the space lattice, at which the intercalation and deintercalation of the lithium ion can be conducted, and another portion not so widened in combination, and thus a capacity can be made still higher. If the elementary molar ratio of the oxygen element to the sulfur element is lower than 0.1, the space lattice of the active material becomes too wide due to the excessive proportion of the sulfur element contained therein, so that the retentivity of the lithium ion upon charging is deteriorated. As a result, there is a possibility that a discharge capacity may be lowered. If the elementary molar ratio of the oxygen element to the sulfur element is higher than 100 on the other hand, the widening of the space lattice of the active material becomes insufficient due to the excessive proportion of the oxygen element contained therein, so that there is a possibility that a discharge capacity and a cycle life may be deteriorated. If the elementary molar ratio of (the oxygen element+the sulfur element) to the transition metal element is lower than 1.0 or higher than 4.0, it is difficult to form an efficient lattice-like compound because the lattice formation of the compound as the active material becomes unstable, so that there is a possibility that a discharge capacity and a cycle life may be deteriorated.

The elementary molar ratio in the present invention expresses the contents of individual elements making up a compound per unit weight in terms of a relative ratio of the elementary molar concentrations.

As the transition metal element making up the compound as a main component of the powder material, for example, a metal element having a d shell or f shell is used. Specific examples of such a metal element include Sc, Y, lanthanoids, actinoids, Ti, Zr, Hf, V, Nb, Ta, Cr, Mo, W, Mn, Tc, Re, Fe, Ru, Os, Co, Rh, Ir, Ni, Pb, Pt, Cu, Ag and Au. In particular, Ti, V, Cr, Mn, Fe, Co, Ni and Cu, which are first transition series metals, are preferably used because they each form an efficient lattice-like compound with oxygen and sulfur elements.

As methods for determining these elements, may be mentioned methods of conducting qualitative analysis and quantitative analysis by the conventional methods such as inductively coupled plasma emission spectrometry, photoelectron spectroscopy, secondary ion mass spectrometry and fluorescent X-ray analysis. As a method for determining the structure of a compound comprised of these elements, may be mentioned X-ray diffractometry.

The powder material according to the present invention is preferably comprised of powder having an mean particle diameter ranging from 0.05 to 100 μm, more preferably from 0.1 to 50 μm. The mean particle diameter is a value determined by a laser scattering method. It is preferred that the mean particle diameter be smaller because the surface area of the powder material becomes wider, whereby a cell reaction smoothly occurs. However, any powder material having a too small particle diameter is difficult to handle.

The powder material is preferably powder having a specific surface area ranging from 1.0 to 500 $m^2/g$, more preferably from 2.0 to 300 $m^2/g$. The specific surface area is a value determined by the BET method. The reaction area of the powder material, through which the lithium ion can go in and out, becomes wider as the specific surface area increases, so that the charging and discharging efficiency is improved. However, when the specific surface area is too wide, the form stability of the powder is lowered, so that there is a possibility that the deterioration of cycle life by charging and discharging may occur.

As described above, the mean particle diameter or specific surface area is preset within the above range, whereby the contact area of individual particles making up the powder material with an electrolytic solution becomes wider, and the migration of the lithium ion is more efficiently conducted. Therefore, a high-capacity secondary battery that a great current can be passed, charging and discharging efficiency is improved, and charging and discharging can be rapidly conducted is realized.

(Preparation of Powder Material)

Figure 4:
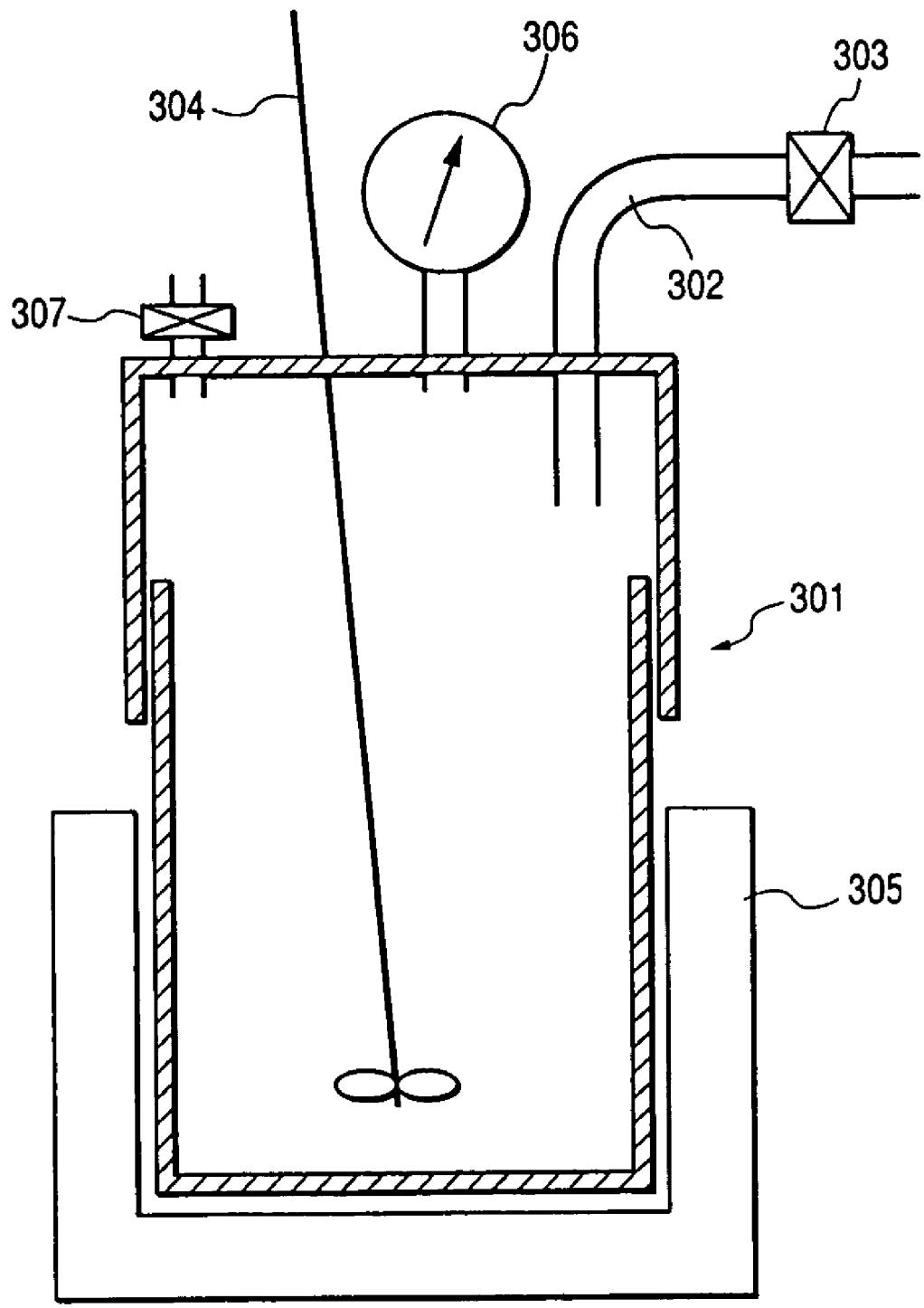
FIG. 4 illustrates an example of the construction of a closed vessel used in a preparation process of a powder material according to the present invention.

The preparation process of the powder material according to the present invention will be described with reference to FIG. 4. As will be readily appreciated by one of ordinary skill in this art, though not described in detail below, reference numerals 306 and 307 indicate a conventional pressure gauge and a conventional relief valve, respectively.

The preparation process of the powder material comprises the steps of:

(1) placing at least one compound (a) selected from a group consisting of carbonates, organic carboxylates, nitrates, hydroxides and oxides of transition metals and a sulfur compound (b), which forms hydrogen sulfide or sulfur, in a vessel 301 (the first half of step I); or as another process, placing at least one compound (c) selected from a group consisting of sulfides, thiocarbonates, thiosulfates, thiocyanates, thioglicolates and thiourea complexes of transition metals and at least one compound (d) selected from a group consisting of carbonates, carbonic acid, organic carboxylates, organic carboxylic acids, nitrates, nitric acid, hydroxides and oxides, which contains no transition metal element, in the vessel 301 (the first half of step II); or a further process, placing at least one compound (a) selected from a group consisting of carbonates, organic carboxylates, nitrates, hydroxides and oxides of transition metals and at least one compound (c) selected from a group consisting of sulfides, thiocarbonates, thiosulfates, thiocyanates, thioglicolates and thiourea complexes of transition metals in the vessel 301 (the first half of step III); and (2) closing the vessel 301 and heating the contents (the second half of step I, II or III).

It is also preferred that after these steps, the steps of washing, drying, grinding and/or calcining the compound thus obtained be conducted as needed. It is further preferred that after conducting the steps (1) and (2) or conducting the steps (1) and (2) and the washing, drying, grinding and/or calcining step, the procedure be repeated again from the step (1) as needed. In this case, a process (step different from the former step in any of the steps I, II and III) different from the process (the first half of step I, II or III) conducted in the former step (1) may also be used in the step (1) on and after the second procedure.

In the step (1), it is preferred that the compound (a) and the compound (b), the compound (c) and the compound (d), or the compound (a) and the compound (c) be mixed in advance. As a method for mixing them, they may be only mixed by stirring them by physical energy. In particular, the use of a method of grinding and mixing them by means of an agitating mill such as a ball mill is preferred because they are more evenly mixed, so that uniform complexing of oxygen, sulfur and transition metal elements takes place upon subsequent heating.

Upon mixing the raw compounds, it is preferred that a compound containing another element than the above elements be simultaneously added in addition to these compounds because an active material in which the additional element is uniformly dispersed can be obtained. In particular, the addition of a compound containing a lithium element is more preferred, since an active material in which a lithium ion is uniformly intercalated between layers of the active material can be obtained. Examples of the compound containing the lithium element include lithium carbonate, lithium organic carboxylates, lithium sulfate, lithium nitride, lithium hydroxide, lithium oxide and lithium sulfide. Of these, lithium hydroxide, lithium oxide and lithium sulfide are preferred because impurities are scarcely formed. The suitable amount of the compounds contains the lithium element at preferably 1.5 times, more preferably 3.0 times, in terms of elementary molar ratio, the transition metal element in the compound containing at least the oxygen element and transition metal element, or in the compound containing at least the sulfur element and transition metal element.

Further, the addition of a reaction solvent is preferred, since complexing of a sulfur element with the compound containing the oxygen element and transition metal or of an oxygen element with the compound containing the sulfur element and transition metal element is allowed to proceed slowly, thereby forming an active material in which the oxygen element and sulfur element are uniformly complexed every nook and corner, and formation of impurities can also be reduced. More preferably, for example, water is used as the reaction solvent.

In the step (2), the raw compounds are heated under pressure, whereby a main component of the powder material can be more uniformly prepared. However, it is necessary to preset the conditions of the pressurizing and heating in view of the complexity of handling the apparatus under high pressure, and the possibility that the compound prepared may become too firm according to conditions, resulting in difficulty of molding the resultant powder material to form an electrode structure.

Preferred conditions for the pressurizing are preferably to conduct the heating under a pressure of 1.0 to 300 kg/cm$^2$. Under such conditions, the complexing of the transition metal element, oxygen element and sulfur element can be more facilitated to obtain a compound as a main component, in which the respective elements are more uniformly dispersed in each particle up to the interior thereof. More preferably, the heating is conducted under a pressure of 2.0 to 200.0 kg/cm$^2$.

The heating temperature is preferably higher because an evener powder material can be prepared. However, when the heating is conducted at a too high temperature, the sulfur element is oxidized into gases such as sulfur dioxide to fly off from the compound formed. Therefore, it is preferred that the heating temperature be preset within a range of from 100 to 800° C. Under such conditions, the complexing of the transition metal element, oxygen element and sulfur element is allowed to more efficiently proceed like the case of the pressurizing, so that a compound as a main component, in which the oxygen element and sulfur element are more uniformly dispersed, can be obtained. More preferably, the heating is conducted at 130 to 400° C.

As a specific method for pressurizing and heating the raw compounds (a and b, c and d, or a and c) in the closed vessel, any method may be used. It is however preferred to place a mixture of the raw compounds in a vessel 301, close the vessel, inject a pressurized gas into the vessel through an inlet 302 to pressurize the raw compounds and then close a valve 303 to heat the raw compounds by a heater 304 while keeping the pressurized state as it is.

At this time, the pressurized gas injected into the vessel is preferably a gas which does not form any impurities with the compounds used in the preparation of the powder material. Preferable examples thereof include inert gases such as argon and helium, nitrogen, oxygen, air, sulfur dioxide, and sulfur monoxide. It is also preferred that the compounds in the vessel be stirred by a stirring apparatus 305 during the heating, since an evener powder material (compound as a main component) can be prepared.

(At Least One Compound (a) Selected from a Group Consisting of Carbonates, Organic Carboxylates, Nitrates, Hydroxides and Oxides of Transition Metals)

Examples of said at least one compound (a) selected from a group consisting of carbonates, organic carboxylates, nitrates, hydroxides and oxides of transition metals, which is used in the preparation of the powder material according to the present invention, include cobalt carbonate, nickel carbonate and manganese carbonate for the carbonates of transition metals; manganese acetate, nickel acetate, cobalt acetate, iron acetate, copper acetate, nickel oxalate, cobalt oxalate, manganese oxalate, iron oxalate and nickel formate for the organic carboxylates of transition metals; iron nitrate, copper nitrate, vanadium nitrate, nickel nitrate, manganese nitrate and cobalt nitrate for the nitrates of transition metals; nickel hydroxide, iron hydroxide, manganese hydroxide, cobalt hydroxide, titanium hydroxide, cobalt oxyhydroxide, nickel oxyhydroxide and manganese oxyhydroxide for the hydroxides of transition metals; and manganese oxide, titanium oxide, chromium oxide, cobalt oxide, nickel oxide, manganese dioxide, iron oxide, copper oxide and vanadium oxide for the oxides of transition metals. Of these, the hydroxides and oxides of transition metals are preferred from the viewpoint of purity because they scarcely have elements which will become a source of formation of impurities.

Examples of the transition metal element include metal elements having a d shell or f shell, i.e., Sc, Y, lanthanoids, actinoids, Ti, Zr, Hf, V, Nb, Ta, Cr, Mo, W, Mn, Tc, Re, Fe, Ru, Os, Co, Rh, Ir, Ni, Pb, Pt, Cu, Ag and Au. In particular, Ti, V, Cr, Mn, Fe, Co, Ni and Cu, which are first transition series metals, are preferred because they each form an efficient intercalation compound with oxygen and sulfur elements. These compounds (a) may be used either singly or in any combination thereof.

(Sulfur Compound (b) which Forms Hydrogen Sulfide or Sulfur)

Examples of the sulfur compound (b) which forms hydrogen sulfide or sulfur and is used in the preparation of the powder material according to the present invention include inorganic compounds or organic compounds which contain a sulfur element in their molecules and are decomposed by heating, addition of water or an acid, or the like to form hydrogen sulfide or sulfur. In particular, the use of a compound decomposed upon heating to form hydrogen sulfide or sulfur is preferred in that a powder material (compound as a main component) evenly containing the sulfur element without locally existing can be obtained. Further, the use of an alkali metal sulfide is preferred in that it tends to form a monomolecule upon heating, and so a powder material (compound as a main component) evenly containing the sulfur element without locally existing can be obtained likewise.

As the compound decomposed upon heating to form hydrogen sulfide or sulfur, thioamides, thiocarbonic acid and derivatives thereof, and thiosulfuric acid and derivatives thereof are particularly preferred because the kinds of decomposition by-products other than hydrogen sulfide or sulfur formed by decomposition upon the heating (upon the heating with the compound (a) in the step I) are few, and impurities are also scarcely formed from the decomposition by-products. Specific examples of such a compound include thioformamide, thioacetamide, thiopropionamide, thiobenzamide and thiostearamide for the thioamides; thiocarbonic acid, ammonium thiocarbonate, lithium thiocarbonate, sodium thiocarbonate and potassium thiocarbonate for the thiocarbonic acid and the derivatives thereof; and ammonium thiosulfate, lithium thiosulfate, sodium thiosulfate and potassium thiosulfate for the thiosulfuric acid and the derivatives thereof.

Examples of the alkali metal sulfide include lithium sulfide, sodium sulfide and potassium sulfide. Of these, lithium sulfide is more preferred.

These compounds may be used either singly or in any combination thereof.

(At least one compound (c) selected from a group consisting of sulfides, thiocarbonates, thiosulfates, thiocyanates, thioglicolates and thiourea complexes of transition metals)

Examples of said at least one compound (c) selected from a group consisting of sulfides, thiocarbonates, thiosulfates, thiocyanates, thioglicolates and thiourea complexes of transition metals, which is used in the preparation of the powder material according to the present invention, include cobalt sulfide, nickel sulfide, iron sulfide, copper sulfide and manganese sulfide for the sulfides of transition metals; cobalt thiocarbonate, nickel thiocarbonate and ammonium copper thiocarbonate for the thiocarbonates of transition metals; copper thiosulfate, iron thiosulfate and nickel thiosulfate for the thiosulfates of transition metals; chromium thiocyanate, cobalt thiocyanate, iron thiocyanate, copper thiocyanate, nickel thiocyanate and vanadium thiocyanate for the thiocyanates of transition metals; nickel thioglicolate and cobalt thioglicolate for the thioglicolates of transition metals; and thiourea copper complex for the thiourea complexes of transition metals. The sulfides, thiocarbonates and thiosulfates of transition metals are particularly preferred because the kinds of decomposition by-products upon the heating (upon the heating with the compound (d) in the step II, or heating with the compound (a) in the step III) are few, and impurities are also scarcely formed from the decomposition by-products.

The transition metal elements making up these sulfides and salts are metal elements having a d shell or f shell as with the above-described compounds (a) containing at least the oxygen element and transition metal element, and examples thereof include Sc, Y, lanthanoids, actinoids, Ti, Zr, Hf, V, Nb, Ta, Cr, Mo, W, Mn, Tc, Re, Fe, Ru, Os, Co, Rh, Ir, Ni, Pb, Pt, Cu, Ag and Au. In particular, Ti, V, Cr, Mn, Fe, Co, Ni and Cu, which are first transition series metals, are preferred because they each form an efficient intercalation compound with oxygen and sulfur elements. These compounds (c) may be used either singly or in any combination thereof.

(At east one compound (d) selected from a group consisting of carbonates, carbonic acid, organic carboxylates, organic carboxylic acids, nitrates, nitric acid, hydroxides and oxides, which contains no transition metal element)

Examples of said at least one compound (d) selected from a group consisting of carbonates, carbonic acid, organic carboxylates, organic carboxylic acids, nitrates, nitric acid, hydroxides and oxides, which contains no transition metal element and is used in the preparation of the powder material according to the present invention, include various kinds of metal salts, ammonium salts, acids and bases which contain no transition metal element, for example, sodium carbonate, lithium carbonate, calcium carbonate, lithium hydrogencarbonate, sodium hydrogencarbonate, carbonic acid, lithium acetate, sodium acetate, calcium acetate, ammonium acetate, acetic acid, lithium oxalate, sodium oxalate, oxalic acid, lithium formate, sodium formate, lithium citrate, sodium citrate, ammonium citrate, citric acid, lithium nitrate, sodium nitrate, magnesium nitrate, potassium nitrate, ammonium nitrate, nitric acid, lithium hydroxide, sodium hydroxide, potassium hydroxide, calcium hydroxide, lithium oxide, sodium oxide, potassium oxide, calcium oxide, hydrogen peroxide, lithium perchlorate, sodium perchlorate, lithium chlorate, sodium chlorate and sodium hypochlorate. Of these, the hydroxides and oxides such as lithium hydroxide, sodium hydroxide, potassium hydroxide, lithium oxide, sodium oxide, potassium oxide, hydrogen peroxide and lithium perchlorate are preferred from the viewpoint of purity because they scarcely have elements which will become a source of formation of impurities, and so decomposition by-products are scarcely formed upon the heating (upon the heating with the compound (c) in the step II). Lithium hydroxide is particularly preferred in that its molecular size is small, and so it can penetrate throughout the compound containing the sulfur element and transition metal element to obtain a powder material (compound as a main component) which serves as a high-discharge capacity active material in which an oxygen element is uniformly complexed every nook and corner. These compounds (d) may be used either singly or in any combination thereof.

Figure 3:
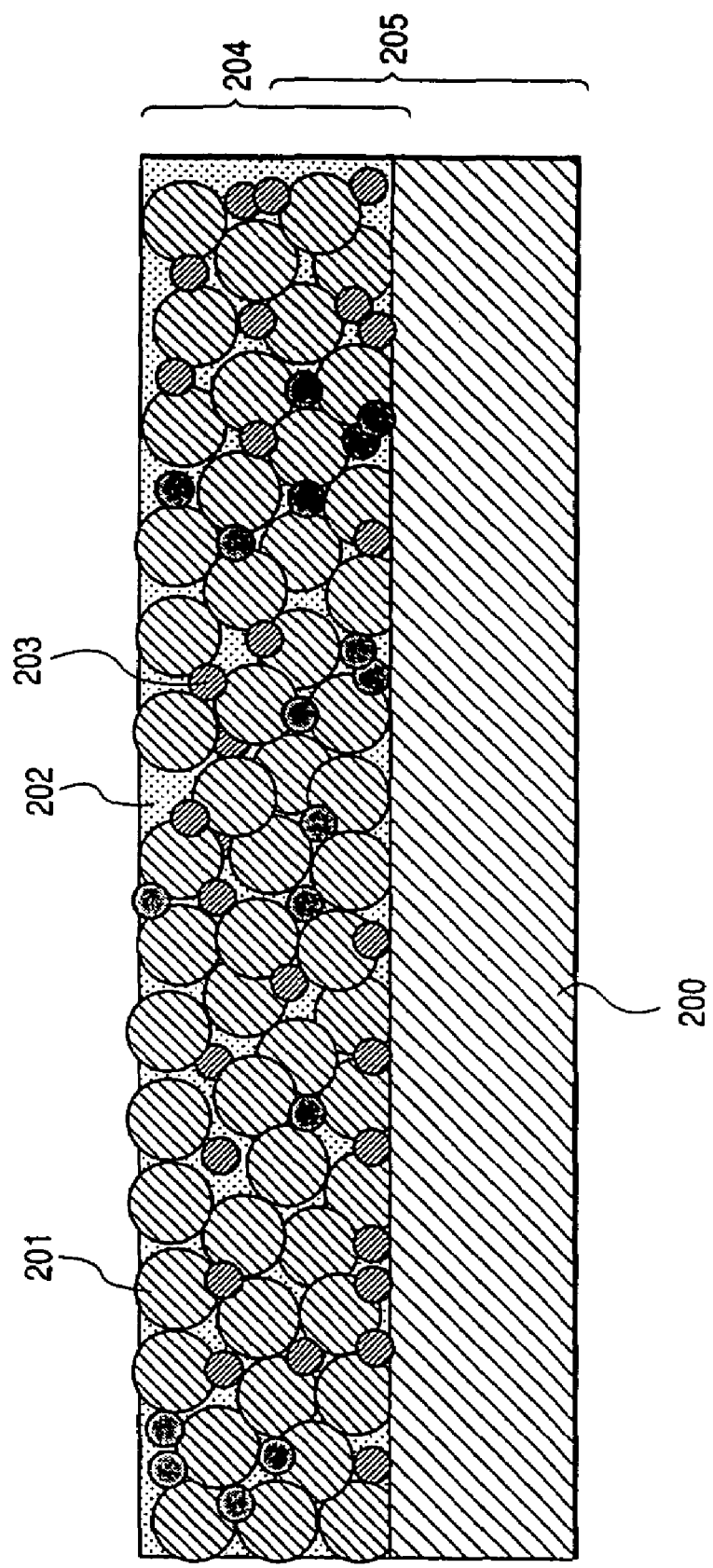
FIG. 3 is a conceptual sectional view illustrating an electrode structure according to an embodiment of the present invention.

FIG. 3 is a conceptual sectional view schematically illustrating an embodiment of an electrode structure 205 formed of the powder material according to the present invention. The electrode structure 205 comprises a collector 200 and a layer (active material layer) 204 formed on the collector 200 by adding a conductive auxiliary 203 and a binder 202 to a powder material 201 (powder material having the elementary constitution illustrated in FIG. 1).

An exemplary process for producing the electrode structure 205 will hereinafter be described.

(1) The powder material 201, binder 202 and conductive auxiliary 203 are mixed, and a solvent is added to the resultant mixture to adjust the viscosity of the mixture, thereby preparing paste.

(2) The paste is applied to the collector 200 and dried to form the electrode structure 205. The thickness of the electrode structure is controlled by roll pressing or the like as needed.

As the coating method, for example, a coating method by a coater, or a screen printing method may be applied. Examples of the conductive auxiliary 203 used in the electrode structure 205 include amorphous carbon (carbon black) such as acetylene black, graphite, and metals inert to a cell reaction. The conductive auxiliary 203 is preferably in the form of powder or fiber. Examples of the binder 202 used in the electrode structure 205 include polyolefins such as polyethylene and polypropylene, and fluorine plastics such as polyvinylidene fluoride and polytetrafluoroethylene.

The collector 200 plays the role of efficiently supplying a current consumed in an electrode reaction upon charging or collecting a current generated upon discharging. Accordingly, a material for forming the collector 200 of the electrode structure 205 is desirably a material which has a high electric conductivity and is inert to a cell reaction. Examples of preferred materials include nickel, stainless steel, titanium, aluminum, copper, platinum, palladium, gold, zinc, various kinds of alloys and composite metals comprised of at least two of the above metals. As the form of the collector 200, for example, forms such as plate, foil, mesh, sponge, fiber, punching metal and expanded metal may be adopted.

Figure 5:
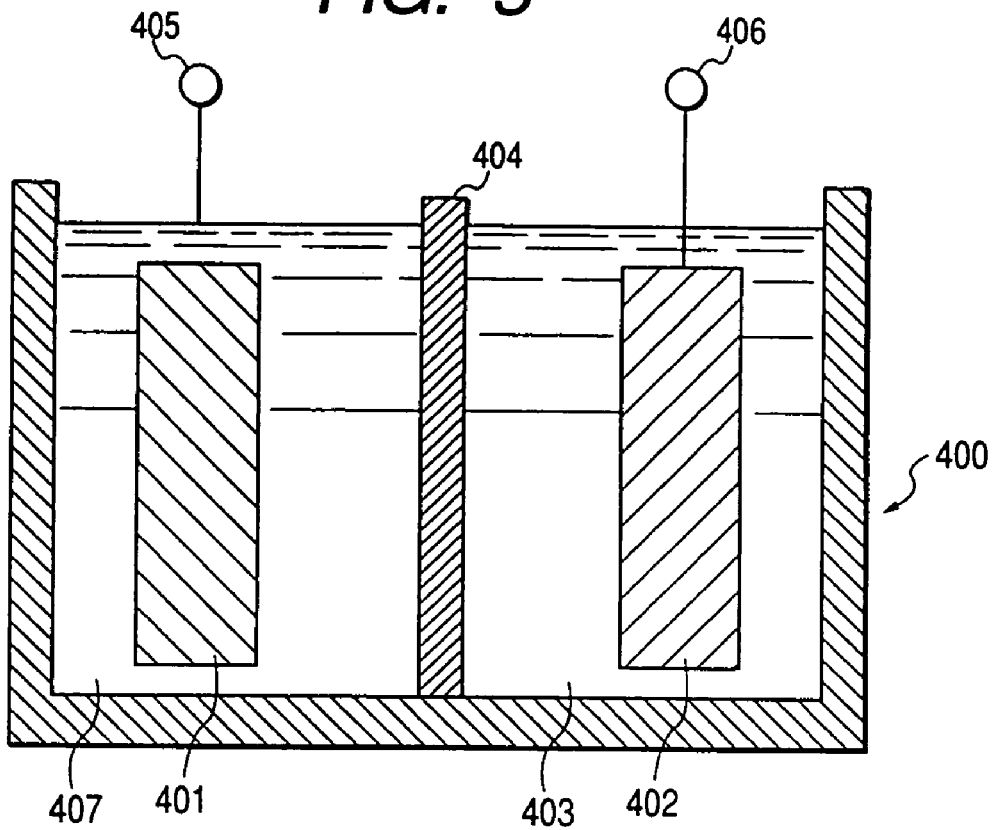
FIG. 5 illustrates an example of the fundamental construction of a secondary lithium battery according to the present invention.

FIG. 5 is a conceptual sectional view schematically illustrating a secondary battery (secondary lithium battery) 400 according to an embodiment of the present invention. A positive electrode 402 and a negative electrode 401 are contained in a battery housing (case) 407 in an opposing relation to each other through an electrolyte 403 and a separator 404, and connected to a positive terminal 406 and a negative terminal 405, respectively.

In the present invention, the electrode structure according to the present invention as represented by 205 in FIG. 3 making use of, for example, a powder material having such a structure as illustrated in FIG. 1 is used as a positive electrode 402, as a negative electrode 401 or as both electrodes of the positive electrode 402 and the negative electrode 401 (however, using different powder materials in both electrodes) according to the electrochemical potential of intercalation and deintercalation of a lithium ion.

(Negative Electrode 401)

When the above-described electrode structure using the powder material according to the present invention is used only as a positive electrode 402 of a secondary lithium battery, any of carbon materials including graphite, metallic lithium, lithium alloys, materials containing a metal element which forms an alloy with lithium, porous metals, and the oxides, sulfides and nitrides of transition metals which have electromotive force with a positive active material may be used as a negative active material which serves as a host material for a lithium ion used in the secondary lithium battery in a negative electrode 401 as a counter electrode. When the negative active material is in the form of powder, a layer of the negative active material is formed on a collector by using a binder or by sintering to produce the negative electrode. When the electric conductivity of the negative active material powder is low, it is necessary to suitably mix a conductive auxiliary like the formation of the active material layer in the above-described electrode structure. As the collector and conductive auxiliary, those used in the electrode structure 205 according to the present invention may be used likewise.

(Positive Electrode 402)

When the above-described electrode structure is used only as a negative electrode 401 of a secondary lithium battery, any of transition metal oxides, transition metal sulfides, transition metal nitrides, lithium-transition metal oxides, lithium-transition metal sulfides and lithium-transition metal nitrides is used as a positive active material which serves as a host material for a lithium ion used in the secondary lithium battery in a positive electrode 402 as a counter electrode. As the transition metal elements of the transition metal oxides, transition metal sulfides, transition metal nitrides, for example, metal elements having a d shell or f shell are preferably used. Specific examples thereof include Sc, Y, lanthanoids, actinoids, Ti, Zr, Hf, V, Nb, Ta, Cr, Mo, W, Mn, Tc, Re, Fe, Ru, Os, Co, Rh, Ir, Ni, Pb, Pt, Cu, Ag and Au. When the positive active material is in the form of powder, a layer of the positive active material is formed on a collector by using a binder or by sintering to produce the positive electrode. When the electric conductivity of the positive active material powder is low, it is necessary to suitably mix a conductive auxiliary like the formation of the active material layer in the above-described electrode structure. As the collector and conductive auxiliary, those used in the electrode structure 205 according to the present invention may be used likewise.

(Separator 404)

The separator 404 plays the role of preventing short between the negative electrode 401 and the positive electrode 402 in the secondary battery 400. The separator 404 may also play the role of holding an electrolytic solution (in the case where a liquid material is used as the electrolyte 403) in some cases.

The separator 404 has pores through which a lithium ion can migrate and requires to be insoluble in and stable to the electrolytic solution. Accordingly, an unwoven fabric or a material having a microporous structure, which is formed of glass, polyolefin such as polypropylene or polyethylene, a fluorine plastics, or the like, is preferably used as the separator. A metal oxide film or a resin film combined with a metal oxide, which has micropores, may also be used. The use of a metal oxide film having a multi-layer structure is particularly effective for the prevention of short because dendrites are hard to pass through. When a film formed of a fluorine plastics, which is a flame retardant material, or a film formed of glass or a metal oxide, which is a non-combustible material, is used, safety can be more enhanced.

(Electrolyte 403)

Methods for using the electrolyte in the present invention include the following three methods:

(1) a method of using the electrolyte as is;
(2) a method of using the electrolyte as a solution in a solvent; and
(3) a method of using the electrolyte in the form solidified by adding a gelling agent such as a polymer to a solution of the electrolyte.

In general, an electrolytic solution with the electrolyte dissolved in a solvent is held by a porous separator to use it. The electric conductivity (ionic conductivity) of the electrolyte must be preferably at least $1 \times 10^{-3}$ S/cm, more preferably at least $5 \times 10^{-3}$ S/cm as measured at 25° C.

Examples of the electrolyte include acids such as $H_2SO_4$, HCl and $HNO_3$, salts comprised of a lithium ion ($Li^+$) and a Lewis acid ion [$BF_4^-$, $PF_6^-$, $AsF_6^-$, $ClO_4^-$, $CF_3SO_3^-$ or $BPh_4^-$ (Ph: phenyl group)], and mixed salts thereof. Salts comprised of a cation such as a sodium ion, potassium ion or tetraalkylammonium ion and a Lewis acid ion may also be used. These salts are desirably thoroughly dehydrated and deoxygenated in advance by heating under reduced pressure, or the like.

Examples of the solvent for the electrolyte include acetonitrile, benzonitrile, propylene carbonate, ethylene carbonate, dimethyl carbonate, diethyl carbonate, dimethylformamide, tetrahydrofuran, nitrobenzene, dichloroethane, diethoxyethane, 1,2-dimethoxyethane, chlorobenzene, γ-butyrolactone, dioxolane, sulfolane, nitromethane, dimethyl sulfide, dimethylsulfoxide, methyl formate, 3-methyl-2-oxazolidinone, 2-methyltetrahydrofuran, 3-propylsydnone, sulfur dioxide, phosphoryl chloride, thionyl chloride, sulfuryl chloride and mixtures thereof.

The above solvents may preferably be dehydrated with, for example, activated alumina, molecular sieve, phosphorus pentoxide or calcium chloride. Further, some solvents may be distilled in the presence of an alkali metal in an inert gas to remove impurities and dehydrate. In order to prevent the electrolytic solution from leaking out, it may preferably be gelled. It is desirable to use, as a gelling agent, a polymer which absorbs the solvent in the electrolytic solution to swell. As such a polymer, there may be used polyethylene oxide, polyvinyl alcohol, polyacrylamide or the like.

(Form and Structure of Battery)

Specific examples of the form of the secondary battery according to the present invention include flat, cylindrical, rectangular parallelopipedic and sheet forms. Examples of the structure of the battery include single-layer, multi-layer and spiral types. Of these, a spiral type cylindrical battery has a feature that an electrode area can be made wider by winding a negative electrode and a positive electrode with a separator put between them, and so a great current can be passed upon charging and discharging. Further, a battery of the rectangular parallelopipedic or sheet form has a feature that a storage space of equipment constituted by containing a plurality of batteries therein can be effectively used.

Figure 6:
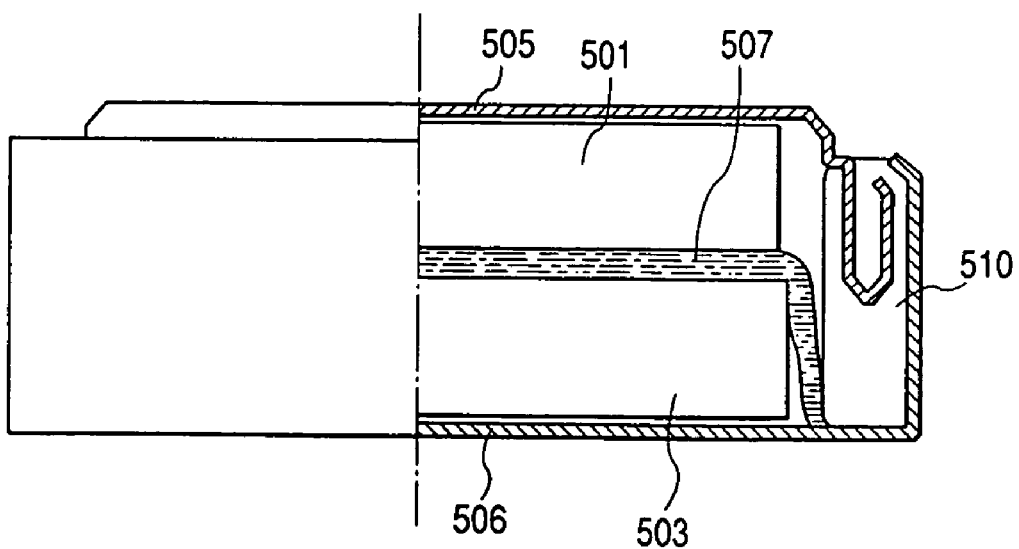
FIG. 6 is a cross-sectional view of a single-layer type flattened battery.

The forms and structures of batteries will hereinafter be described in more detail with reference to FIGS. 6 and 7. FIG. 6 is a cross-sectional view of a single-layer type flattened (coin-shaped) battery, and FIG. 7 is a cross-sectional view of a spiral type cylindrical battery. These lithium batteries fundamentally have the same constitution as the battery illustrated in FIG. 5 and comprise a negative electrode, a positive electrode, electrolyte.separator, a battery housing and output terminals.

In FIGS. 6 and 7, reference numerals 501 and 603 indicate negative electrodes, 503 and 606 positive electrodes, 505 and 608 negative terminals (negative cap or negative can), 506 and 609 positive terminals (positive can or positive cap), 507 and 607 separators.electrolytic solutions, 510 and 610 gaskets, 601 a negative collector, 604 a positive collector, 611 an insulating plate, 612 a negative lead, 613 a positive lead, and 614 a safety valve.

In the flattened (coin-shaped) secondary battery illustrated in FIG. 6, the positive electrode 503 containing an active material layer for positive electrode and the negative electrode 501 equipped with an active material layer for negative electrode are laminated on each other through the separator 507 holding at least the electrolytic solution therein. The laminate is contained from the side of the positive electrode in the positive can 506 as the positive terminal, and the side of the negative electrode is covered with the negative cap 505 as the negative terminal. The gasket 510 is arranged at another portion within the positive can 506.

In the spiral type cylindrical secondary battery illustrated in FIG. 7, the positive electrode 606 having an active material layer 605 for positive electrode formed on the positive collector 604 and the negative electrode 603 having an active material layer 602 for negative electrode formed on the negative collector 601 are opposed to each other through the separator 607 holding at least the electrolytic solution therein and wound up into a multi-layer to form a laminate of a cylindrical structure. The laminate of the cylindrical structure is contained in the negative can 608 as the negative terminal. The positive cap 609 as the positive terminal is provided on the opening side of the negative can 608. The gasket 610 is arranged at another portion within the negative can 608. The electrode laminate of the cylindrical structure is separated from the side of the positive cap 609 through the insulating plate 611. The positive electrode 606 is connected to the positive cap 609 through the positive lead 613. The negative electrode 603 is connected to the negative can 608 through the negative lead 612. The safety valve 614 for adjusting the pressure within the battery is provided on the side of the positive cap 609.

As described above, layers comprised of the powder material according to the present invention are used in the active material layer for the negative electrode 501 and the active material layer 602 for the negative electrode 603.

An example of a method for assembling the batteries illustrated in FIGS. 6 and 7 will hereinafter be described.

(1) The separator (507, 607) is put between the negative electrode (501, 603) and the positive electrode (503, 606), and the resultant laminate is incorporated into the positive can (506) or the negative can (608).

(2) After the electrolytic solution is poured into the can, the negative cap (505) or the positive cap (609) and the gasket (510, 610) are assembled.

(3) The assembly obtained in the step (2) is cramped, thereby completing the batteries.

The preparation of the materials and assembly of the batteries in the above-described lithium batteries are desirably conducted in dry air or dry inert gas from which water has been fully removed.

Components making up such a secondary battery as described above will hereinafter be described.

(Insulating Packing)

As a material for the gasket (510, 610), for example, fluorine plastics, polyamide resins, polysulfone resins and various kinds of rubber may be used. As methods for sealing the battery, methods such as glass sealing, adhesive sealing, welding and soldering are used in addition to "caulking" making use of an insulating packing as illustrated in FIGS. 6 and 7. As a material for the insulating plate in FIG. 6, there may be used various kinds of organic resin materials and ceramics.

(Outer Case)

An outer case for battery is comprised of a positive or negative can (506, 608) and a negative or positive cap (505, 609). As a material for the outer case, stainless steel is preferably used. In particular, a titanium clad stainless steel plate, copper clad stainless steel plate or nickel plated stainless steel plate is often used.

Since the positive can (506) in FIG. 6, or the negative can (608) in FIG. 7 is combined with a battery housing (case), the stainless steel is preferred. In the case where the positive can or negative can is not combined with the battery housing, however, examples of the material for the battery case include metals such as zinc, plastics such as polypropylene and composite materials comprised of metal or glass fiber and plastic in addition to the stainless steel.

(Safety Valve)

A safety valve is provided in the secondary lithium batteries as a safety measure for raised pressure within the batteries though not illustrated in FIG. 6. As the safety valve, for example, rubber, spring, metal ball or rapture foil may be used.

The present invention will hereinafter be described in detail by the following Examples. However, the present invention is not limited to these examples. Incidentally, all designations of "part" or "parts" and "%" as will be used in the following examples mean part or parts by weight and % by weight unless expressly noted.

EXAMPLE 1

In this example, a secondary lithium battery having a sectional structure illustrated in FIG. 6 was fabricated. Natural graphite was used for a negative electrode, while a powder materiel comprised mainly of a lithium-cobalt.oxygen.sulfur compound prepared by the following process according to the present invention was used for a positive electrode. The preparation procedure of individual components of the battery and the assembly of the battery will hereinafter be described with respect to FIG. 6.

(1) Preparation of Positive Electrode 503:

Ten parts of cobalt oxyhydroxide, 4 parts of thioacetamide and 100 parts of lithium hydroxide were added to 100 parts of water, and the mixture was thoroughly stirred. The mixture was placed in a pressure vessel which can be closed, and compressed air was injected into the vessel until the pressure within the pressure vessel reached 8 $kg/cm^2$ to close the vessel. The pressure vessel was then placed in a thermostatic chamber controlled at 160° C. and continuously heated for 48 hours. Thereafter, the contents were taken out of the pressure vessel, washed with water, vacuum dried at 100° C. and ground in a planetary ball mill to obtain powder comprised mainly of a lithium-cobalt.oxygen.sulfur compound.

The thus-obtained powder comprised mainly of the lithium-cobalt.oxygen.sulfur compound was analyzed by an inductively coupled plasma emission spectrometer and an X-ray photoelectron spectrometer. As a result, the total content of oxygen, sulfur and cobalt elements in the powder was 75% in terms of the concentration based on the number of atoms. With respect to the elementary molar ratio of the oxygen, sulfur and cobalt elements, the ratio of the oxygen element to the sulfur element was 1.5, and the ratio of (the oxygen element+the sulfur element) to the cobalt element was 2.0. The powder was subjected to qualitative analysis by an X-ray diffractometer. As a result, the powder was considered to be comprised mainly of the lithium-cobalt.oxygen-.sulfur compound which corresponds neither to a cobalt oxide system nor to a cobalt sulfide system. The powder comprised mainly of the lithium-cobalt.oxygen.sulfur compound was subjected to measurement by a particle size distribution meter making use of a laser scattering method. As a result, the mean particle diameter of the powder was found to be 1.1 μm. Its specific surface area was 5.9 $m^2/g$ as measured by gas absorption in accordance with the BET (Brunauer-Emmett-Teller) method using a specific surface area meter.

Five parts of carbon powder comprised of acetylene black and 5 parts of polyvinylidene fluoride powder were mixed with 90 parts of the powder comprised mainly of the lithium-cobalt.oxygen.sulfur compound, and the resultant mixture was then added to 100 parts of N-methyl-2-pyrrolidone to prepare paste. The paste was applied to an aluminum foil, dried and then vacuum dried at 150° C. to prepare a positive electrode 503.

(2) Preparation of Negative Electrode 501:

After 5 parts of polyvinylidene fluoride powder were mixed with 95 parts of fine particles of natural graphite heat-treated at 2,000° C. in an argon gas atmosphere, 100 parts of N-methyl-2-pyrrolidone were added to the resultant mixture to prepare paste. The paste was applied to a collector made of copper foil and vacuum dried at 150° C. to prepare a negative electrode 501.

(3) Preparation of Electrolytic Solution 507:

Equal amounts of ethylene carbonate (EC) and dimethyl carbonate (DMC) which had been thoroughly dehydrated were mixed to prepare a mixed solvent. Lithium borate tetrafluoride was dissolved in a proportion of 1 M (mol/l) in the mixed solvent thus obtained to use the resultant solution as an electrolytic solution.

Separator 507:

A porous film formed of polyethylene was used as a separator.

Assembly of Battery:

The separator 507 holding the electrolytic solution therein was put between the negative electrode 501 and the positive electrode 503, and the resultant laminate was placed in a positive can 506 made of titanium clad stainless steel. The positive can 506 was then covered with an insulating packing 510 made of polypropylene and a negative cap 505 made of titanium clad stainless steel, and the assembly thus obtained was cramped to obtain a secondary lithium battery. These assembly steps were all conducted in a dry argon gas atmosphere.

(Charging and Discharging Test of Battery)

The performance of the thus-obtained secondary lithium battery was evaluated. The performance evaluation was conducted as to the charging and discharging efficiency and discharge capacity of the battery after 5 charging and discharging cycles. The cycle test was conducted regarding a cycle consisting of charging and discharging of 1 C (current once as much as capacity/time) and a rest period for 30 minutes as one cycle. The capacity in this test was based on the capacity of the positive active material. The charging and discharging test was started from charging.

COMPARATIVE EXAMPLE 1

In this example, a secondary lithium battery having the structure illustrated in FIG. 6 was fabricated in the same manner as in Example 1 except that a positive active material (powder material) was prepared by the following process different from that in Example 1, and its performance evaluation was conducted likewise.

Preparation of Positive Electrode 503:

Ten parts of cobalt oxyhydroxide and 100 parts of lithium hydroxide were added to 100 parts of water, and the mixture was thoroughly stirred. The mixture was placed in a pressure vessel which can be closed, and compressed air was injected into the vessel until the pressure within the pressure vessel reached 8 kg/cm$^2$ to close the vessel. The pressure vessel was then placed in a thermostatic chamber controlled at 160° C. and continuously heated for 48 hours. Thereafter, the contents were taken out of the pressure vessel, washed with water, vacuum dried at 100° C. and ground in a planetary ball mill to obtain powder comprised mainly of lithium-cobalt oxide.

A positive electrode 503 was prepared in the same manner as in Example 1 except that the powder comprised mainly of lithium-cobalt oxide was used in place of the powder comprised mainly of the lithium-cobalt.oxygen.sulfur compound.

EXAMPLE 2

In this example, a secondary lithium battery having the sectional structure illustrated in FIG. 6 was fabricated in the same manner as in Example 1 except that a powder material and a positive electrode prepared in a manner described below were used, and its performance evaluation was conducted likewise.

Preparation of Positive Electrode 503:

Ten parts of nickel sulfide and 100 parts of lithium hydroxide were ground and stirred in a planetary ball mill, and the mixture was added to 100 parts of water and thoroughly stirred. The mixture was placed in a pressure vessel which can be closed, and compressed oxygen was injected into the vessel until the pressure within the pressure vessel reached 8 kg/cm$^2$ to close the vessel. The pressure vessel was then placed in a thermostatic chamber controlled at 160° C. and continuously heated for 48 hours. Thereafter, the contents were taken out of the pressure vessel, washed with water, vacuum dried at 100° C., calcined at 300° C. for 20 hours in the air and then ground in a planetary ball mill to obtain powder comprised mainly of a lithium-nickel.oxygen.sulfur compound.

The thus-obtained powder comprised mainly of the lithium-nickel.oxygen.sulfur compound was analyzed by an inductively coupled plasma emission spectrometer and an X-ray photoelectron spectrometer. As a result, the total content of oxygen, sulfur and nickel elements in the powder was 76% in terms of the concentration based on the number of atoms. With respect to the elementary molar ratio of the oxygen, sulfur and nickel elements, the ratio of the oxygen element to the sulfur element was 1.5, and the ratio of (the oxygen element+the sulfur element) to the nickel element was 2.0. The powder was subjected to qualitative analysis by an X-ray diffractometer. As a result, the powder was considered to be comprised mainly of the lithium-nickel.oxygen-.sulfur compound which corresponds neither to a nickel oxide system nor to a nickel sulfide system. The powder comprised mainly of the lithium-nickel.oxygen.sulfur compound was subjected to measurement by a particle size distribution meter making use of a laser scattering method. As a result, the mean particle diameter of the powder was found to be 2.2 μm. Its specific surface area was 3.0 m$^2$/g as measured by gas absorption in accordance with the BET method using a specific surface area meter.

Five parts of carbon powder comprised of acetylene black and 5 parts of polyvinylidene fluoride powder were mixed with 90 parts of the powder comprised mainly of the lithium-nickel.oxygen.sulfur compound, and the resultant mixture was then added to 100 parts of N-methyl-2-pyrrolidone to prepare paste. The paste was applied to an aluminum foil, dried and then vacuum dried at 150° C. to prepare a positive electrode 503.

COMPARATIVE EXAMPLE 2

In this example, a secondary lithium battery having the structure illustrated in FIG. 6 was fabricated in the same manner as in Example 2 except that a positive active material (powder material) was prepared by the following process different from that in Example 2, and its performance evaluation was conducted likewise.

Preparation of Positive Electrode 503:

Ten parts of nickel oxide and 100 parts of lithium hydroxide were added to 100 parts of water, and the mixture was thoroughly stirred. The mixture was placed in a pressure vessel which can be closed, and compressed air was injected into the vessel until the pressure within the pressure vessel reached 8 kg/cm$^2$ to close the vessel. The pressure vessel was then placed in a thermostatic chamber controlled at 160° C. and continuously heated for 48 hours. Thereafter, the contents were taken out of the pressure vessel, washed with water, vacuum dried at 100° C., calcined at 300° C. for 20 hours in the air and then ground in a planetary ball mill to obtain powder comprised mainly of lithium-nickel oxide.

A positive electrode 503 was prepared in the same manner as in Example 2 except that the powder comprised mainly of lithium-nickel oxide was used in place of the powder comprised mainly of the lithium-nickel.oxygen.sulfur compound.

EXAMPLE 3

In this example, a secondary lithium battery having the sectional structure illustrated in FIG. 6 was fabricated in the same manner as in Example 1 except that a powder material and a positive electrode prepared in a manner described below were used, and its performance evaluation was conducted likewise.

Preparation of Positive Electrode 503:

Ten parts of nickel oxyhydroxide, 12 parts of thioacetamide and 50 parts of lithium hydroxide were added to 50 parts of water, and the mixture was thoroughly stirred. The mixture was placed in a pressure vessel which can be closed, and compressed nitrogen was injected into the vessel until the pressure within the pressure vessel reached 70 kg/cm$^2$ to close the vessel. The pressure vessel was then placed in a thermostatic chamber controlled at 200° C. and continuously heated for 48 hours. Thereafter, the contents were taken out of the pressure vessel, washed with water, vacuum dried at 100° C., calcined at 300° C. for 20 hours in the air and then ground in a planetary ball mill to obtain powder comprised mainly of a lithium-nickel.oxygen.sulfur compound.

The thus-obtained powder comprised mainly of the lithium-nickel.oxygen.sulfur compound was analyzed by an inductively coupled plasma emission spectrometer and an X-ray photoelectron spectrometer. As a result, the total content of oxygen, sulfur and nickel elements in the powder was 77% in terms of the concentration based on the number of atoms. With respect to the elementary molar ratio of the oxygen, sulfur and nickel elements, the ratio of the oxygen element to the sulfur element was 0.5, and the ratio of (the oxygen element+the sulfur element) to the nickel element was 2.2. The powder was subjected to qualitative analysis by an X-ray diffractometer. As a result, the powder was considered to be comprised mainly of the lithium-nickel.oxygen..sulfur compound which corresponds neither to a nickel oxide system nor to a nickel sulfide system. The powder comprised mainly of the lithium-nickel.oxygen.sulfur compound was subjected to measurement by a particle size distribution meter making use of a laser scattering method. As a result, the mean particle diameter of the powder was found to be 1.8 μm. Its specific surface area was 35.1 m$^2$/g as measured by gas absorption in accordance with the BET method using a specific surface area meter.

Five parts of carbon powder comprised of acetylene black and 5 parts of polyvinylidene fluoride powder were mixed with 90 parts of the powder comprised mainly of the lithium-nickel.oxygen.sulfur compound, and the resultant mixture was then added to 100 parts of N-methyl-2-pyrrolidone to prepare paste. The paste was applied to an aluminum foil, dried and then vacuum dried at 150° C. to prepare a positive electrode 503.

COMPARATIVE EXAMPLE 3

In this example, a secondary lithium battery was fabricated in the same manner as in Example 3 except that a positive active material (powder material) was prepared by the following process different from that in Example 3, and its performance evaluation was conducted likewise.

Preparation of Positive Electrode 503:

Ten parts of nickel hydroxide and 50 parts of lithium hydroxide were ground and mixed in a planetary ball mill, calcined at 750° C. for 20 hours in the air and then ground in the planetary ball mill to obtain powder comprised mainly of lithium-nickel oxide.

A positive electrode 503 was prepared in the same manner as in Example 3 except that the powder comprised mainly of lithium-nickel oxide was used in place of the powder comprised mainly of the lithium-nickel.oxygen.sulfur compound.

EXAMPLE 4

In this example, a secondary lithium battery having the sectional structure illustrated in FIG. 6 was fabricated in the same manner as in Example 1 except that a powder material and a positive electrode prepared in a manner described below were used, and its performance evaluation was conducted likewise.

Preparation of Positive Electrode 503:

Ten parts of manganese sulfide and 50 parts of lithium hydroxide were added to 70 parts of water, and the mixture was thoroughly stirred. The mixture was placed in a pressure vessel which can be closed, and compressed air was injected into the vessel until the pressure within the pressure vessel reached 2 kg/cm$^2$ to close the vessel. The pressure vessel was then heated to 220° C. by a heater, and the heating was continued for 24 hours. Thereafter, the contents were taken out of the pressure vessel, washed with water, vacuum dried at 100° C., calcined at 300° C. for 20 hours in the air and then ground in a planetary ball mill to obtain powder comprised mainly of a lithium-manganese.oxygen.sulfur compound.

The thus-obtained powder comprised mainly of the lithium-manganese.oxygen.sulfur compound was analyzed by an inductively coupled plasma emission spectrometer and an X-ray photoelectron spectrometer. As a result, the total content of oxygen, sulfur and manganese elements in the powder was 78% in terms of the concentration based on the number of atoms. With respect to the elementary molar ratio of the oxygen, sulfur and manganese elements, the ratio of the oxygen element to the sulfur element was 0.7, and the ratio of (the oxygen element+the sulfur element) to the manganese element was 3.0. The powder was subjected to qualitative analysis by an X-ray diffractometer. As a result, the powder was considered to be comprised mainly of the lithium-manganese.oxygen.sulfur compound which corresponds neither to a manganese oxide system nor to a manganese sulfide system. The powder comprised mainly of the lithium-manganese.oxygen.sulfur compound was subjected to measurement by a particle size distribution meter making use of a laser scattering method. As a result, the mean particle diameter of the powder was found to be 2.5 μm. Its specific surface area was 4.7 m$^2$/g as measured by gas absorption in accordance with the BET method using a specific surface area meter.

Three parts of carbon powder comprised of acetylene black and 3 parts of polyvinylidene fluoride powder were mixed with 94 parts of the powder comprised mainly of the lithium-manganese.oxygen.sulfur compound, and the resultant mixture was then added to 100 parts of N-methyl-2-pyrrolidone to prepare paste. The paste was applied to an aluminum foil, dried and then vacuum dried at 150° C. to prepare a positive electrode 503.

COMPARATIVE EXAMPLE 4

In this example, a secondary lithium battery was fabricated in the same manner as in Example 4 except that a positive active material (powder material) was prepared by the following process different from that in Example 4, and its performance evaluation was conducted likewise.

Preparation of Positive Electrode 503:

Ten parts of manganese sulfide and 50 parts of lithium hydroxide were added to 70 parts of water, and the mixture was thoroughly stirred. The mixture was placed in a pressure vessel and held under normal pressure without pressurizing. The pressure vessel was then heated to 220° C. by a heater in an open state, and the heating was continued for 24 hours. Thereafter, the contents were taken out of the pressure vessel, washed with water, vacuum dried at 100° C. and ground in a planetary ball mill to obtain the intended powder.

The powder thus obtained was analyzed by an inductively coupled plasma emission spectrometer and an X-ray photoelectron spectrometer. As a result, it was found that the compound contains no oxygen element, and the powder is comprised mainly of lithium-manganese sulfide containing only sulfur and manganese elements.

A positive electrode 503 was prepared in the same manner as in Example 4 except that the powder comprised mainly of lithium-manganese sulfide was used in place of the powder comprised mainly of the lithium-manganese.oxygen.sulfur compound.

EXAMPLE 5

In this example, a secondary lithium battery having the sectional structure illustrated in FIG. 6 was fabricated in the same manner as in Example 1 except that a powder material and a positive electrode prepared in a manner described below were used, and its performance evaluation was conducted likewise.

Preparation of Positive Electrode 503:

Eight parts of nickel oxyhydroxide, 2 parts of manganese dioxide, 4 parts of thioacetamide and 100 parts of lithium hydroxide were added to 100 parts of water, and the mixture was thoroughly stirred. The mixture was placed in a pressure vessel which can be closed, and compressed argon gas was injected into the vessel until the pressure within the pressure vessel reached 15 kg/cm$^2$ to close the vessel. The pressure vessel was then placed in a thermostatic chamber controlled at 160° C. and continuously heated for 48 hours. Thereafter, the contents were taken out of the pressure vessel, washed with water, vacuum dried at 100° C. and ground in a planetary ball mill to obtain powder comprised mainly of a lithium-nickel.manganese.oxygen.sulfur compound.

The thus-obtained powder comprised mainly of the lithium-nickel.manganese.oxygen.sulfur compound was analyzed by an inductively coupled plasma emission spectrometer and an X-ray photoelectron spectrometer. As a result, the total content of oxygen, sulfur, nickel and manganese elements in the powder was 76% in terms of the concentration based on the number of atoms. With respect to the elementary molar ratio of the oxygen, sulfur, nickel and manganese elements, the ratio of the oxygen element to the sulfur element was 1.5, and the ratio of (the oxygen element+the sulfur element) to (the nickel element+the manganese element) was 2.0. The powder was subjected to qualitative analysis by an X-ray diffractometer. As a result, the powder was considered to be comprised mainly of the lithium-nickel.manganese.oxygen.sulfur compound which corresponds to none of a nickel oxide system, a manganese oxide system, a nickel sulfide system and a manganese sulfide system. The powder comprised mainly of the lithium-nickel.manganese.oxygen.sulfur compound was subjected to measurement by a particle size distribution meter making use of a laser scattering method. As a result, the mean particle diameter of the powder was found to be 1.2 μm. Its specific surface area was 2.7 m$^2$/g as measured by gas absorption in accordance with the BET method using a specific surface area meter.

Five parts of carbon powder comprised of acetylene black and 5 parts of polyvinylidene fluoride powder were mixed with 90 parts of the powder comprised mainly of the lithium-nickel.manganese.oxygen.sulfur compound, and the resultant mixture was then added to 100 parts of N-methyl-2-pyrrolidone to prepare paste. The paste was applied to an aluminum foil, dried and then vacuum dried at 150° C. to prepare a positive electrode 503.

COMPARATIVE EXAMPLE 5

In this example, a secondary lithium battery was fabricated in the same manner as in Example 5 except that a positive active material (powder material) was prepared by the following process different from that in Example 5, and its performance evaluation was conducted likewise.

Preparation of Positive Electrode 503:

Eight parts of nickel oxyhydroxide, 2 parts of manganese dioxide and 100 parts of lithium hydroxide were added to 100 parts of water, and the mixture was thoroughly stirred. The mixture was placed in a pressure vessel which can be closed, and compressed argon gas was injected into the vessel until the pressure within the pressure vessel reached 15 kg/cm$^2$ to close the vessel. The pressure vessel was then placed in a thermostatic chamber controlled at 160° C. and continuously heated for 48 hours. Thereafter, the contents were taken out of the pressure vessel, washed with water, vacuum dried at 100° C. and ground in a planetary ball mill to obtain powder comprised mainly of lithium-nickel manganese oxide.

A positive electrode 503 was prepared in the same manner as in Example 5 except that the powder comprised mainly of lithium-nickel manganese oxide was used in place of the powder comprised mainly of the lithium-nickel.manganese.oxygen.sulfur compound.

EXAMPLE 6

In this example, a secondary lithium battery having the sectional structure illustrated in FIG. 6 was fabricated in the same manner as in Example 1 except that a powder material and a positive electrode prepared in a manner described below were used, and its performance evaluation was conducted likewise.

Preparation of Positive Electrode 503:

Ten parts of ferric hydroxide, 4 parts of thioacetamide and 100 parts of lithium hydroxide were added to 100 parts of water, and the mixture was thoroughly stirred. The mixture was placed in a pressure vessel which can be closed, and compressed air was injected into the vessel until the pressure within the pressure vessel reached 8 kg/cm$^2$ to close the vessel. The pressure vessel was then placed in a thermostatic chamber controlled at 220° C. and continuously heated for 48 hours. Thereafter, the contents were taken out of the pressure vessel, washed with water, vacuum dried at 100° C. and ground in a planetary ball mill to obtain powder comprised mainly of a lithium-iron.oxygen.sulfur compound.

The thus-obtained powder comprised mainly of the lithium-iron.oxygen.sulfur compound was analyzed by an inductively coupled plasma emission spectrometer and an X-ray photoelectron spectrometer. As a result, the total content of oxygen, sulfur and iron elements in the powder was 75% in terms of the concentration based on the number of atoms. With respect to the elementary molar ratio of the oxygen, sulfur and iron elements, the ratio of the oxygen element to the sulfur element was 1.6, and the ratio of (the oxygen element+the sulfur element) to the iron element was 2.0. The powder was subjected to qualitative analysis by an X-ray diffractometer. As a result, the powder was considered to be comprised mainly of the lithium-iron.oxygen.sulfur compound which corresponds neither to an iron oxide system nor to an iron sulfide system. The powder comprised mainly of the lithium-iron.oxygen.sulfur compound was subjected to measurement by a particle size distribution meter making use of a laser scattering method. As a result, the mean particle diameter of the powder was found to be 1.5 μm. Its specific surface area was 7.8 m²/g as measured by gas absorption in accordance with the BET method using a specific surface area meter.

Five parts of carbon powder comprised of acetylene black and 5 parts of polyvinylidene fluoride powder were mixed with 90 parts of the powder comprised mainly of the lithium-iron.oxygen.sulfur compound, and the resultant mixture was then added to 100 parts of N-methyl-2-pyrrolidone to prepare paste. The paste was applied to an aluminum foil, dried and then vacuum dried at 150° C. to prepare a positive electrode 503.

COMPARATIVE EXAMPLE 6

In this example, a secondary lithium battery was fabricated in the same manner as in Example 6 except that a positive active material (powder material) was prepared by the following process different from that in Example 6, and its performance evaluation was conducted likewise.

Preparation of Positive Electrode 503:

Ten parts of ferric hydroxide and 100 parts of lithium hydroxide were added to 100 parts of water, and the mixture was thoroughly stirred. The mixture was placed in a pressure vessel which can be closed, and compressed air was injected into the vessel until the pressure within the pressure vessel reached 8 kg/cm² to close the vessel. The pressure vessel was then placed in a thermostatic chamber controlled at 220° C. and continuously heated for 48 hours. Thereafter, the contents were taken out of the pressure vessel, washed with water, vacuum dried at 100° C. and ground in a planetary ball mill to obtain powder comprised mainly of lithium-iron oxide.

A positive electrode 503 was prepared in the same manner as in Example 6 except that the powder comprised mainly of lithium-iron oxide was used in place of the powder comprised mainly of the lithium-iron.oxygen.sulfur compound.

EXAMPLE 7

In this example, a secondary lithium battery having the sectional structure illustrated in FIG. 6 was fabricated in the same manner as in Example 1 except that a powder material and a negative electrode prepared in a manner described below were used, and the electrode prepared from the lithium-cobalt oxide used in Comparative Example 1 was used as a positive electrode, and its performance evaluation was conducted likewise. Incidentally, the capacity in this example was based on the capacity of the negative active material.

Preparation of Negative Electrode 501:

Ten parts of titanium oxide and 4 parts of thioacetamide were added to 100 parts of water, and the mixture was thoroughly stirred. The mixture was placed in a pressure vessel which can be closed, and compressed air was injected into the vessel until the pressure within the pressure vessel reached 8 kg/cm² to close the vessel. The pressure vessel was then placed in a thermostatic chamber controlled at 220° C. and continuously heated for 48 hours. Thereafter, the contents were taken out of the pressure vessel, washed with water, vacuum dried at 100° C. and ground in a planetary ball mill to obtain powder comprised mainly of a titanium.oxygen.sulfur compound.

The thus-obtained powder comprised mainly of the titanium.oxygen.sulfur compound was analyzed by an inductively coupled plasma emission spectrometer and an X-ray photoelectron spectrometer. As a result, the total content of oxygen, sulfur and titanium elements in the powder was 71% in terms of the concentration based on the number of atoms. With respect to the elementary molar ratio of the oxygen, sulfur and titanium elements, the ratio of the oxygen element to the sulfur element was 1.7, and the ratio of (the oxygen element+ the sulfur element) to the titanium element was 2.0. The powder was subjected to qualitative analysis by an X-ray diffractometer. As a result, the powder was considered to be comprised mainly of the titanium.oxygen.sulfur compound which corresponds neither to a titanium oxide system nor to a titanium sulfide system. The powder comprised mainly of the titanium.oxygen.sulfur compound was subjected to measurement by a particle size distribution meter making use of a laser scattering method. As a result, the mean particle diameter of the powder was found to be 1.1 µm. Its specific surface area was 9.9 m²/g as measured by gas absorption in accordance with the BET method using a specific surface area meter.

Five parts of carbon powder comprised of acetylene black and 5 parts of polyvinylidene fluoride powder were mixed with 90 parts of the powder comprised mainly of the titanium.oxygen.sulfur compound, and the resultant mixture was then added to 100 parts of N-methyl-2-pyrrolidone to prepare paste. The paste was applied to a platinum foil, dried and then vacuum dried at 150° C. to prepare a negative electrode 501.

COMPARATIVE EXAMPLE 7

In this example, a secondary lithium battery was fabricated in the same manner as in Example 7 except that a negative active material (powder material) was prepared by the following process different from that in Example 7, and its performance evaluation was conducted likewise.

Preparation of Negative Electrode 501:

Ten parts of titanium oxide were added to 100 parts of water, and the mixture was thoroughly stirred. The mixture was placed in a pressure vessel which can be closed, and compressed air was injected into the vessel until the pressure within the pressure vessel reached 8 kg/cm² to close the vessel. The pressure vessel was then placed in a thermostatic chamber controlled at 220° C. and continuously heated for 48 hours. Thereafter, the contents were taken out of the pressure vessel, washed with water, vacuum dried at 100° C. and ground in a planetary ball mill to obtain powder of titanium oxide.

A negative electrode 501 was prepared in the same manner as in Example 7 except that the powder of titanium oxide was used in place of the powder comprised mainly of the titanium.oxygen.sulfur compound.

The charging and discharging performance of the secondary lithium batteries fabricated in Examples 1 to 7 and Comparative Examples 1 to 7 is shown collectively in Table 1. The evaluation results as to the charging and discharging efficiency, which is a ratio of the quantity of electricity upon discharging to the quantity of electricity upon charging, and the discharge capacity shown in Table 1 are standardized by comparing the corresponding example and comparative example, e.g., Example 1 and Comparative Example 1, or Example 2 and Comparative Example 2 and regarding the value in the comparative example as 1.0.

As shown in Table 1, it was found that when the powder materials according to the examples are used in secondary batteries, all the secondary batteries can be provided as secondary lithium batteries high in charging and discharging efficiency, and discharge capacity.

TABLE 1

|  |  | Main compounds used in preparation of active material | Pressure upon preparation (kg/cm$^2$) | Charging*[1] and discharging efficiency | Discharge capacity*[2] |
|---|---|---|---|---|---|
| Ex. 1 | Pos. | Cobalt oxyhydroxide Thioacetamide | 8 | 1.2 | 1.3 |
| Ex. 2 | Pos. | Nickel sulfide Lithium hydroxide | 8 | 1.2 | 1.3 |
| Ex. 3 | Pos. | Nickel oxyhydroxide Thioacetamide | 70 | 1.2 | 1.2 |
| Ex. 4 | Pos. | Manganese sulfide Lithium hydroxide | 2 | 1.4 | 1.6 |
| Ex. 5 | Pos. | Nickel oxyhydroxide Manganese dioxide Thioacetamide | 15 | 1.3 | 1.4 |
| Ex. 6 | Pos. | Ferric hydroxide Thioacetamide Lithium hydroxide | 8 | 1.5 | 1.8 |
| Ex. 7 | Neg. | Titanium oxide Thioacetamide | 8 | 1.2 | 1.2 |

*[1]The charging and discharging efficiency in the fifth charging and discharging cycle, which is a ratio of the discharge capacity to the charge capacity, was standardized regarding the value of each comparative example as 1. In Example 4 and Comparative Example 4, the values in the second charging and discharging cycle were standardized because deterioration by cycle in Comparative Example 4 was hard.

*[2]The discharge capacity in the fifth charging and discharging cycle was standardized regarding the value of each comparative example as 1. In Example 4 and Comparative Example 4, the values in the second charging and discharging cycle were standardized because deterioration by cycle in Comparative Example 4 was hard.

What is claimed is:

1. A process for preparing a powder material comprised mainly of a compound which electrochemically intercalates and deintercalates a lithium ion and contains at least an oxygen element, a sulfur element and at least one transition metal element, the process comprising at least one step selected from a group consisting of:

(I) a step of heating at least one compound (a) selected from a group consisting of carbonates, organic carboxylates, nitrates, hydroxides and oxides of transition metals, and a sulfur compound (b) which forms hydrogen sulfide or sulfur, in a closed vessel;

(II) a step of heating at least one compound (c) selected from a group consisting of sulfides, thiocarbonates, thiosulfates, thiocyanates, thioglicolates and thiourea complexes of transition metals and at least one compound (d) selected from a group consisting of carbonates, carbonic acid, organic carboxylates, organic carboxylic acids, nitrates, nitric acid, hydroxides and oxides, which contains no transition metal element, in a closed vessel; and (III) a step of heating at least one compound (a) selected from a group consisting of carbonates, organic carboxylates, nitrates, hydroxides and oxides of transition metals and at least one compound (c) selected from a group consisting of sulfides, thiocarbonates, thiosulfates, thiocyanates, thioglicolates and thiourea complexes of transition metals in a closed vessel.

2. The process according to claim 1, wherein in each of the steps (I) to (III), a compound containing at least a lithium element is added to any of the respective compounds, followed by heating the resultant mixture in the closed vessel.

3. The process according to claim 2, wherein at least one compound selected from a group consisting of lithium hydroxide, lithium oxide and lithium sulfide is used as the compound containing at least a lithium element in each of the steps (I) to (III).

4. The process according to claim 1, which comprises a step of mixing the compounds to be used by means of physical energy prior to the step (I), (II) or (III).

5. The process according to claim 4, wherein the step of mixing the compounds to be used is a step of grinding and mixing them by means of a grinding machine.

6. The process according to claim 1, wherein the heating in the closed vessel in each of the steps (I) to (III) is conducted under a pressure of 1.0 to 300 kg/cm$^2$.

7. The process according to claim 6, wherein the heating under pressure is conducted under a pressure of 2 to 200 kg/cm$^2$.

8. The process according to claim 1, wherein the heating in the closed vessel in each of the steps (I) to (III) is conducted at 100 to 800 °C.

9. The process according to claim 8, wherein the heating in the closed vessel is conducted at 130 to 400°C.

10. The process according to claim 1, wherein the heating in the closed vessel is a step of heating the respective compounds in a solvent.

11. The process according to claim 10, wherein the solvent is water.

12. The process according to claim 1, wherein the heating in the closed vessel is a step of heating the respective compounds in an atmosphere comprised of at least one kind of gas selected from a group consisting of nitrogen, oxygen, air, sulfur dioxide, sulfur monoxide, hydrogen sulfide, and inert gases such as argon and helium.

13. The process according to claim 1, wherein the compound (b) which forms hydrogen sulfide or sulfur is a compound which forms hydrogen sulfide or sulfur upon heating.

14. The process according to claim 13, wherein the compound (b) which forms hydrogen sulfide or sulfur is at least one compound selected from a group consisting of thioamides, thiocarbonic acid and derivatives thereof, and thiosulfuric acid and derivatives thereof.

15. The process according to claim 1, wherein the compound (b) which forms hydrogen sulfide or sulfur is an alkali metal sulfide.

16. The process according to claim 15, wherein the alkali metal sulfide is lithium sulfide.

17. The process according to claim 1, wherein the compound (a) is at least one compound selected from a group consisting of hydroxides and oxides of transition metals.

18. The process according to claim 1, wherein the compound (c) is at least one compound selected from a group consisting of sulfides, thiocarbonates and thiosulfates of transition metals.

19. The process according to claim 1, wherein the compound (d) is at least one compound selected from a group consisting of hydroxides and oxides, which contains no transition metal element.

20. The process according to claim 19, wherein the compound (d) is lithium hydroxide.

21. A process for producing an electrode structure for a battery utilizing the intercalation and deintercalation reaction of a lithium ion, the process comprising the steps of:

preparing a powder material, which electrochemically intercalates and deintercalates a lithium ion and contains at least an oxygen element, a sulfur element and at least one transition metal element, in accordance with the preparation process according to any one of claims 1 through 20; and molding the powder material to obtain an electrode structure.

\* \* \* \* \*